(12) United States Patent
Kanter et al.

(10) Patent No.: US 8,972,472 B2
(45) Date of Patent: Mar. 3, 2015

(54) APPARATUS AND METHODS FOR HARDWARE-EFFICIENT UNBIASED ROUNDING

(75) Inventors: Ofir Avraham Kanter, Yoqneam (IL); Ilan Bar, Kiryat Motzkin (IL)

(73) Assignee: Densbits Technologies Ltd., Haifa (IL)

( * ) Notice: Subject to any disclaimer, the term of this patent is extended or adjusted under 35 U.S.C. 154(b) by 1128 days.

(21) Appl. No.: 12/595,961

(22) PCT Filed: Sep. 17, 2008

(86) PCT No.: PCT/IL2008/001240
§ 371 (c)(1),
(2), (4) Date: Oct. 15, 2009

(87) PCT Pub. No.: WO2009/118720
PCT Pub. Date: Oct. 1, 2009

(65) Prior Publication Data
US 2010/0131580 A1    May 27, 2010

Related U.S. Application Data

(60) Provisional application No. 61/064,760, filed on Mar. 25, 2008, provisional application No. 61/071,404, filed on Apr. 28, 2008.

(51) Int. Cl.
*G06F 7/38* (2006.01)
*G06F 7/499* (2006.01)

(52) U.S. Cl.
CPC .................................. *G06F 7/49963* (2013.01)
USPC ........................................................ 708/551

(58) Field of Classification Search
None
See application file for complete search history.

(56) References Cited

U.S. PATENT DOCUMENTS

| | | |
|---|---|---|
| 4,430,701 A | 2/1984 | Christian et al. |
| 4,463,375 A | 7/1984 | Macovski |
| 4,584,686 A | 4/1986 | Fritze |
| 4,589,084 A | 5/1986 | Fling et al. |
| 4,777,589 A | 10/1988 | Boettner et al. |
| 4,866,716 A | 9/1989 | Weng |

(Continued)

FOREIGN PATENT DOCUMENTS

WO    WO2009053963 A2    4/2009

OTHER PUBLICATIONS

International Search Report for International Application No. PCT/IL08/01240 mailed Mar. 23, 2009.

(Continued)

*Primary Examiner* — Henry Tsai
*Assistant Examiner* — Aurangzeb Hassan
(74) *Attorney, Agent, or Firm* — Dentons US LLP (57) ABSTRACT

A system and method for unbiased rounding away from, or toward, zero by truncating N bits from a M bit input number to provide a M–N bit number, and adding the equivalent value of '½' to the M–N bit number unless the input number is negative, or positive, respectively, and the N truncated bits represent exactly ½. The method for rounding away from zero may include outputting a (M–N) bit truncated number if the M-bit input number is negative and the sequence of N truncated bits comprises a most significant bit of 1, followed by zeros; and otherwise, computing and outputting a sum of (a) a number that has an equivalent value of one followed by (N–1) replicas of zero, the one provided by applying a logical operation on the most significant bit of the sequence of truncated bits and (b) the (M–N) bit truncated number.

14 Claims, 6 Drawing Sheets

(56) References Cited

U.S. PATENT DOCUMENTS

| | | | |
|---|---|---|---|
| 5,003,597 A | 3/1991 | Merkle | |
| 5,077,737 A | 12/1991 | Leger et al. | |
| 5,297,153 A | 3/1994 | Baggen et al. | |
| 5,305,276 A | 4/1994 | Uenoyama | |
| 5,592,641 A | 1/1997 | Doyle et al. | |
| 5,623,620 A | 4/1997 | Alexis et al. | |
| 5,640,529 A | 6/1997 | Hasbun | |
| 5,657,332 A | 8/1997 | Auclair et al. | |
| 5,663,901 A | 9/1997 | Harari et al. | |
| 5,724,538 A | 3/1998 | Morris et al. | |
| 5,729,490 A | 3/1998 | Calligaro et al. | |
| 5,740,395 A | 4/1998 | Wells et al. | |
| 5,745,418 A | 4/1998 | Hu et al. | |
| 5,778,430 A | 7/1998 | Ish et al. | |
| 5,793,774 A | 8/1998 | Usui et al. | |
| 5,920,578 A | 7/1999 | Zook | |
| 5,926,409 A | 7/1999 | Engh et al. | |
| 5,933,368 A | 8/1999 | Hu et al. | |
| 5,956,268 A | 9/1999 | Lee | |
| 5,956,473 A | 9/1999 | Hu et al. | |
| 5,968,198 A | 10/1999 | Balachandran et al. | |
| 5,982,659 A | 11/1999 | Irrinki et al. | |
| 6,011,741 A | 1/2000 | Harari et al. | |
| 6,016,275 A | 1/2000 | Han | |
| 6,038,634 A | 3/2000 | Ji et al. | |
| 6,081,878 A | 6/2000 | Estakhri et al. | |
| 6,094,465 A | 7/2000 | Stein et al. | |
| 6,119,245 A | 9/2000 | Hiratsuka | |
| 6,182,261 B1 | 1/2001 | Haller et al. | |
| 6,192,497 B1 | 2/2001 | Yang et al. | |
| 6,195,287 B1 | 2/2001 | Hirano | |
| 6,199,188 B1 | 3/2001 | Shen et al. | |
| 6,209,114 B1 | 3/2001 | Wolf et al. | |
| 6,223,198 B1 * | 4/2001 | Oberman et al. | 708/620 |
| 6,243,728 B1 * | 6/2001 | Farooqui et al. | 708/209 |
| 6,259,627 B1 | 7/2001 | Wong | |
| 6,272,052 B1 | 8/2001 | Miyauchi | |
| 6,278,633 B1 | 8/2001 | Wong et al. | |
| 6,279,133 B1 | 8/2001 | Vafai et al. | |
| 6,301,151 B1 | 10/2001 | Engh et al. | |
| 6,370,061 B1 | 4/2002 | Yachareni et al. | |
| 6,374,383 B1 | 4/2002 | Weng | |
| 6,504,891 B1 | 1/2003 | Chevallier | |
| 6,532,169 B1 | 3/2003 | Mann et al. | |
| 6,532,556 B1 | 3/2003 | Wong et al. | |
| 6,553,533 B2 | 4/2003 | Demura et al. | |
| 6,560,747 B1 | 5/2003 | Weng | |
| 6,637,002 B1 | 10/2003 | Weng et al. | |
| 6,639,865 B2 | 10/2003 | Kwon | |
| 6,674,665 B1 | 1/2004 | Mann et al. | |
| 6,675,281 B1 | 1/2004 | Oh et al. | |
| 6,704,902 B1 | 3/2004 | Shinbashi et al. | |
| 6,751,766 B2 | 6/2004 | Guterman et al. | |
| 6,772,274 B1 | 8/2004 | Estakhri | |
| 6,781,910 B2 | 8/2004 | Smith | |
| 6,792,569 B2 | 9/2004 | Cox et al. | |
| 6,873,543 B2 | 3/2005 | Smith et al. | |
| 6,891,768 B2 | 5/2005 | Smith et al. | |
| 6,914,809 B2 | 7/2005 | Hilton et al. | |
| 6,915,477 B2 | 7/2005 | Gollamudi et al. | |
| 6,952,365 B2 | 10/2005 | Gonzalez et al. | |
| 6,961,890 B2 | 11/2005 | Smith | |
| 6,968,421 B2 | 11/2005 | Conley | |
| 6,990,012 B2 | 1/2006 | Smith et al. | |
| 6,996,004 B1 | 2/2006 | Fastow et al. | |
| 6,999,854 B2 | 2/2006 | Roth | |
| 7,010,739 B1 | 3/2006 | Feng et al. | |
| 7,012,835 B2 | 3/2006 | Gonzalez et al. | |
| 7,038,950 B1 | 5/2006 | Hamilton et al. | |
| 7,068,539 B2 | 6/2006 | Guterman et al. | |
| 7,079,436 B2 | 7/2006 | Perner et al. | |
| 7,149,950 B2 | 12/2006 | Spencer et al. | |
| 7,177,977 B2 | 2/2007 | Chen et al. | |
| 7,188,228 B1 | 3/2007 | Chang et al. | |
| 7,191,379 B2 | 3/2007 | Adelmann et al. | |
| 7,196,946 B2 | 3/2007 | Chen et al. | |
| 7,203,874 B2 | 4/2007 | Roohparvar | |
| 7,212,426 B2 | 5/2007 | Park et al | |
| 7,290,203 B2 | 10/2007 | Emma et al. | |
| 7,292,365 B2 | 11/2007 | Knox | |
| 7,301,928 B2 | 11/2007 | Nakabayashi et al. | |
| 7,315,916 B2 | 1/2008 | Bennett et al. | |
| 7,388,781 B2 | 6/2008 | Litsyn et al. | |
| 7,395,404 B2 | 7/2008 | Gorobets et al. | |
| 7,441,067 B2 | 10/2008 | Gorobets et al. | |
| 7,443,729 B2 | 10/2008 | Li et al. | |
| 7,450,425 B2 | 11/2008 | Aritome | |
| 7,454,670 B2 | 11/2008 | Kim et al. | |
| 7,466,575 B2 | 12/2008 | Shalvi et al. | |
| 7,533,328 B2 | 5/2009 | Alrod et al. | |
| 7,558,109 B2 | 7/2009 | Brandman et al. | |
| 7,593,263 B2 | 9/2009 | Sokolov et al. | |
| 7,610,433 B2 | 10/2009 | Randell et al. | |
| 7,613,043 B2 | 11/2009 | Cornwell et al. | |
| 7,619,922 B2 | 11/2009 | Li et al. | |
| 7,697,326 B2 | 4/2010 | Sommer et al. | |
| 7,706,182 B2 | 4/2010 | Shalvi et al. | |
| 7,716,538 B2 | 5/2010 | Gonzalez et al. | |
| 7,804,718 B2 | 9/2010 | Kim | |
| 7,805,663 B2 | 9/2010 | Brandman et al. | |
| 7,805,664 B1 | 9/2010 | Yang et al. | |
| 7,844,877 B2 | 11/2010 | Litsyn et al. | |
| 7,911,848 B2 | 3/2011 | Eun et al. | |
| 7,948,267 B1 * | 5/2011 | Mauer et al. | 326/38 |
| 7,961,797 B1 | 6/2011 | Yang et al. | |
| 7,975,192 B2 | 7/2011 | Sommer et al. | |
| 8,020,073 B2 | 9/2011 | Emma et al. | |
| 8,108,590 B2 | 1/2012 | Chow et al. | |
| 8,122,328 B2 | 2/2012 | Liu et al. | |
| 8,159,881 B2 | 4/2012 | Yang | |
| 8,190,961 B1 | 5/2012 | Yang et al. | |
| 8,250,324 B2 | 8/2012 | Haas et al. | |
| 8,300,823 B2 | 10/2012 | Bojinov et al. | |
| 8,305,812 B2 | 11/2012 | Levy et al. | |
| 8,327,246 B2 | 12/2012 | Weingarten et al. | |
| 8,407,560 B2 | 3/2013 | Ordentlich et al. | |
| 8,417,893 B2 | 4/2013 | Khmelnitsky et al. | |
| 2001/0034815 A1 | 10/2001 | Dugan et al. | |
| 2002/0063774 A1 | 5/2002 | Hillis et al. | |
| 2002/0085419 A1 | 7/2002 | Kwon et al. | |
| 2002/0154769 A1 | 10/2002 | Petersen et al. | |
| 2002/0156988 A1 | 10/2002 | Toyama et al. | |
| 2002/0174156 A1 * | 11/2002 | Birru et al. | 708/551 |
| 2003/0014582 A1 | 1/2003 | Nakanishi | |
| 2003/0065876 A1 | 4/2003 | Lasser | |
| 2003/0101404 A1 | 5/2003 | Zhao et al. | |
| 2003/0105620 A1 | 6/2003 | Bowen | |
| 2003/0177300 A1 | 9/2003 | Lee et al. | |
| 2003/0192007 A1 | 10/2003 | Miller et al. | |
| 2004/0015771 A1 | 1/2004 | Lasser et al. | |
| 2004/0030971 A1 | 2/2004 | Tanaka et al. | |
| 2004/0059768 A1 * | 3/2004 | Denk et al. | 708/497 |
| 2004/0080985 A1 | 4/2004 | Chang et al. | |
| 2004/0153722 A1 | 8/2004 | Lee | |
| 2004/0153817 A1 | 8/2004 | Norman et al. | |
| 2004/0181735 A1 | 9/2004 | Xin | |
| 2004/0203591 A1 | 10/2004 | Lee | |
| 2004/0210706 A1 | 10/2004 | In et al. | |
| 2005/0013165 A1 | 1/2005 | Ban | |
| 2005/0018482 A1 | 1/2005 | Cemea et al. | |
| 2005/0083735 A1 | 4/2005 | Chen et al. | |
| 2005/0117401 A1 | 6/2005 | Chen et al. | |
| 2005/0120265 A1 | 6/2005 | Pline et al. | |
| 2005/0128811 A1 | 6/2005 | Kato et al. | |
| 2005/0138533 A1 | 6/2005 | Le Bars et al. | |
| 2005/0144213 A1 * | 6/2005 | Simkins et al. | 708/490 |
| 2005/0144368 A1 | 6/2005 | Chung et al. | |
| 2005/0169057 A1 | 8/2005 | Shibata et al. | |
| 2005/0172179 A1 | 8/2005 | Brandenberger et al. | |
| 2005/0213393 A1 | 9/2005 | Lasser | |
| 2005/0243626 A1 | 11/2005 | Ronen | |
| 2006/0059406 A1 | 3/2006 | Micheloni et al. | |
| 2006/0059409 A1 | 3/2006 | Lee | |
| 2006/0064537 A1 | 3/2006 | Oshima | |

(56) References Cited

U.S. PATENT DOCUMENTS

| | | |
|---|---|---|
| 2006/0101193 A1 | 5/2006 | Murin |
| 2006/0136536 A1* | 6/2006 | Lutz et al. ............... 708/204 |
| 2006/0195651 A1 | 8/2006 | Estakhri et al. |
| 2006/0203587 A1 | 9/2006 | Li et al. |
| 2006/0221692 A1 | 10/2006 | Chen |
| 2006/0230093 A1* | 10/2006 | New et al. ............... 708/551 |
| 2006/0248434 A1 | 11/2006 | Radke et al. |
| 2006/0268608 A1 | 11/2006 | Noguchi et al. |
| 2006/0282411 A1 | 12/2006 | Fagin et al. |
| 2006/0284244 A1 | 12/2006 | Forbes et al. |
| 2006/0294312 A1 | 12/2006 | Walmsley |
| 2007/0025157 A1 | 2/2007 | Wan et al. |
| 2007/0063180 A1 | 3/2007 | Asano et al. |
| 2007/0081388 A1 | 4/2007 | Joo |
| 2007/0098069 A1 | 5/2007 | Gordon |
| 2007/0103992 A1 | 5/2007 | Sakui et al. |
| 2007/0104004 A1 | 5/2007 | So et al. |
| 2007/0109858 A1 | 5/2007 | Conley et al. |
| 2007/0124652 A1 | 5/2007 | Litsyn et al. |
| 2007/0140006 A1 | 6/2007 | Chen et al. |
| 2007/0143561 A1 | 6/2007 | Gorobets |
| 2007/0150694 A1 | 6/2007 | Chang et al. |
| 2007/0168625 A1 | 7/2007 | Cornwell et al. |
| 2007/0171714 A1 | 7/2007 | Wu et al. |
| 2007/0171730 A1 | 7/2007 | Ramamoorthy et al. |
| 2007/0180346 A1 | 8/2007 | Murin |
| 2007/0185951 A1* | 8/2007 | Lee et al. ............... 708/493 |
| 2007/0223277 A1 | 9/2007 | Tanaka et al. |
| 2007/0226582 A1 | 9/2007 | Tang et al. |
| 2007/0226592 A1 | 9/2007 | Radke |
| 2007/0228449 A1 | 10/2007 | Takano et al. |
| 2007/0253249 A1 | 11/2007 | Kang et al. |
| 2007/0253250 A1 | 11/2007 | Shibata et al. |
| 2007/0263439 A1 | 11/2007 | Cornwell et al. |
| 2007/0266291 A1 | 11/2007 | Toda et al. |
| 2007/0271494 A1 | 11/2007 | Gorobets |
| 2007/0297226 A1 | 12/2007 | Mokhlesi |
| 2008/0010581 A1 | 1/2008 | Alrod et al. |
| 2008/0028014 A1 | 1/2008 | Hilt et al. |
| 2008/0049497 A1 | 2/2008 | Mo |
| 2008/0055989 A1 | 3/2008 | Lee et al. |
| 2008/0082897 A1 | 4/2008 | Brandman et al. |
| 2008/0092026 A1 | 4/2008 | Brandman et al. |
| 2008/0104309 A1 | 5/2008 | Cheon et al. |
| 2008/0112238 A1 | 5/2008 | Kim et al. |
| 2008/0116509 A1 | 5/2008 | Harari et al. |
| 2008/0126686 A1 | 5/2008 | Sokolov et al. |
| 2008/0127104 A1 | 5/2008 | Li et al. |
| 2008/0128790 A1 | 6/2008 | Jung |
| 2008/0130341 A1 | 6/2008 | Shalvi et al. |
| 2008/0137413 A1 | 6/2008 | Kong et al. |
| 2008/0137414 A1 | 6/2008 | Park et al. |
| 2008/0141043 A1 | 6/2008 | Flynn et al. |
| 2008/0148115 A1 | 6/2008 | Sokolov et al. |
| 2008/0158958 A1 | 7/2008 | Sokolov et al. |
| 2008/0159059 A1 | 7/2008 | Moyer |
| 2008/0162079 A1 | 7/2008 | Astigarraga et al. |
| 2008/0168216 A1 | 7/2008 | Lee |
| 2008/0168320 A1 | 7/2008 | Cassuto et al. |
| 2008/0181001 A1 | 7/2008 | Shalvi |
| 2008/0198650 A1 | 8/2008 | Shalvi et al. |
| 2008/0198652 A1 | 8/2008 | Shalvi et al. |
| 2008/0201620 A1 | 8/2008 | Gollub |
| 2008/0209114 A1 | 8/2008 | Chow et al. |
| 2008/0219050 A1 | 9/2008 | Shalvi et al. |
| 2008/0225599 A1 | 9/2008 | Chae |
| 2008/0250195 A1 | 10/2008 | Chow et al. |
| 2008/0263262 A1 | 10/2008 | Sokolov et al. |
| 2008/0282106 A1 | 11/2008 | Shalvi et al. |
| 2008/0285351 A1 | 11/2008 | Shlick et al. |
| 2008/0301532 A1 | 12/2008 | Uchikawa et al. |
| 2009/0024905 A1 | 1/2009 | Shalvi et al. |
| 2009/0027961 A1 | 1/2009 | Park et al. |
| 2009/0043951 A1 | 2/2009 | Shalvi et al. |
| 2009/0046507 A1 | 2/2009 | Aritome |
| 2009/0072303 A9 | 3/2009 | Prall et al. |
| 2009/0091979 A1 | 4/2009 | Shalvi |
| 2009/0103358 A1 | 4/2009 | Sommer et al. |
| 2009/0106485 A1 | 4/2009 | Anholt |
| 2009/0113275 A1 | 4/2009 | Chen et al. |
| 2009/0125671 A1 | 5/2009 | Flynn |
| 2009/0132755 A1 | 5/2009 | Radke |
| 2009/0144598 A1 | 6/2009 | Yoon et al. |
| 2009/0144600 A1 | 6/2009 | Perlmutter et al. |
| 2009/0150599 A1 | 6/2009 | Bennett |
| 2009/0150748 A1 | 6/2009 | Egner et al. |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0187803 A1 | 7/2009 | Anholt et al. |
| 2009/0199074 A1 | 8/2009 | Sommer |
| 2009/0213653 A1 | 8/2009 | Perlmutter et al. |
| 2009/0213654 A1 | 8/2009 | Perlmutter et al. |
| 2009/0228761 A1 | 9/2009 | Perlmutter et al. |
| 2009/0240872 A1 | 9/2009 | Perlmutter et al. |
| 2009/0282185 A1 | 11/2009 | Van Cauwenbergh |
| 2009/0282186 A1 | 11/2009 | Mokhlesi et al. |
| 2009/0287930 A1 | 11/2009 | Nagaraja |
| 2009/0300269 A1 | 12/2009 | Radke et al. |
| 2009/0323942 A1 | 12/2009 | Sharon et al. |
| 2010/0005270 A1 | 1/2010 | Jiang |
| 2010/0025811 A1 | 2/2010 | Bronner et al. |
| 2010/0030944 A1 | 2/2010 | Hinz |
| 2010/0058146 A1 | 3/2010 | Weingarten et al. |
| 2010/0064096 A1 | 3/2010 | Weingarten et al. |
| 2010/0088557 A1 | 4/2010 | Weingarten et al. |
| 2010/0091535 A1 | 4/2010 | Sommer et al. |
| 2010/0095186 A1 | 4/2010 | Weingarten |
| 2010/0110787 A1 | 5/2010 | Shalvi et al. |
| 2010/0115376 A1 | 5/2010 | Shalvi et al. |
| 2010/0122113 A1 | 5/2010 | Weingarten et al. |
| 2010/0124088 A1 | 5/2010 | Shalvi et al. |
| 2010/0131580 A1 | 5/2010 | Kanter et al. |
| 2010/0131806 A1 | 5/2010 | Weingarten et al. |
| 2010/0131809 A1 | 5/2010 | Katz |
| 2010/0131826 A1 | 5/2010 | Shalvi et al. |
| 2010/0131827 A1 | 5/2010 | Sokolov et al. |
| 2010/0131831 A1 | 5/2010 | Weingarten et al. |
| 2010/0146191 A1 | 6/2010 | Katz |
| 2010/0146192 A1 | 6/2010 | Weingarten et al. |
| 2010/0149881 A1 | 6/2010 | Lee et al. |
| 2010/0172179 A1 | 7/2010 | Gorobets et al. |
| 2010/0174853 A1 | 7/2010 | Lee et al. |
| 2010/0180073 A1 | 7/2010 | Weingarten et al. |
| 2010/0199149 A1 | 8/2010 | Weingarten et al. |
| 2010/0211724 A1 | 8/2010 | Weingarten |
| 2010/0211833 A1 | 8/2010 | Weingarten |
| 2010/0211856 A1 | 8/2010 | Weingarten |
| 2010/0241793 A1 | 9/2010 | Sugimoto et al. |
| 2010/0246265 A1 | 9/2010 | Moschiano et al. |
| 2010/0251066 A1 | 9/2010 | Radke |
| 2010/0253555 A1 | 10/2010 | Weingarten et al. |
| 2010/0257309 A1 | 10/2010 | Barsky et al. |
| 2010/0269008 A1 | 10/2010 | Leggette et al. |
| 2010/0293321 A1 | 11/2010 | Weingarten |
| 2010/0318724 A1 | 12/2010 | Yeh |
| 2011/0051521 A1 | 3/2011 | Levy et al. |
| 2011/0055461 A1 | 3/2011 | Steiner et al. |
| 2011/0093650 A1 | 4/2011 | Kwon et al. |
| 2011/0096612 A1 | 4/2011 | Steiner et al. |
| 2011/0099460 A1 | 4/2011 | Dusija et al. |
| 2011/0119562 A1 | 5/2011 | Steiner et al. |
| 2011/0153919 A1 | 6/2011 | Sabbag |
| 2011/0161775 A1 | 6/2011 | Weingarten |
| 2011/0194353 A1 | 8/2011 | Hwang et al. |
| 2011/0209028 A1 | 8/2011 | Post et al. |
| 2011/0214029 A1 | 9/2011 | Steiner et al. |
| 2011/0214039 A1 | 9/2011 | Steiner et al. |
| 2011/0246792 A1 | 10/2011 | Weingarten |
| 2011/0246852 A1 | 10/2011 | Sabbag |
| 2011/0252187 A1 | 10/2011 | Segal et al. |
| 2011/0252188 A1 | 10/2011 | Weingarten |
| 2011/0271043 A1 | 11/2011 | Segal et al. |
| 2011/0302428 A1 | 12/2011 | Weingarten |

(56) References Cited

U.S. PATENT DOCUMENTS

| | | | |
|---|---|---|---|
| 2012/0001778 A1 | 1/2012 | Steiner et al. |
| 2012/0005554 A1 | 1/2012 | Steiner et al. |
| 2012/0005558 A1 | 1/2012 | Steiner et al. |
| 2012/0005560 A1 | 1/2012 | Steiner et al. |
| 2012/0008401 A1 | 1/2012 | Katz et al. |
| 2012/0008414 A1 | 1/2012 | Katz et al. |
| 2012/0017136 A1 | 1/2012 | Ordentlich et al. |
| 2012/0051144 A1 | 3/2012 | Weingarten et al. |
| 2012/0063227 A1 | 3/2012 | Weingarten et al. |
| 2012/0066441 A1 | 3/2012 | Weingarten |
| 2012/0110250 A1 | 5/2012 | Sabbag et al. |
| 2012/0124273 A1 | 5/2012 | Goss et al. |
| 2012/0246391 A1 | 9/2012 | Meir et al. |

OTHER PUBLICATIONS

Search Report of PCT Patent Application WO 2009/118720 A3.
Search Report of PCT Patent Application WO 2009/095902 A3.
Search Report of PCT Patent Application WO 2009/078006 A3.
Search Report of PCT Patent Application WO 2009/074979 A3.
Search Report of PCT Patent Application WO 2009/074978 A3.
Search Report of PCT Patent Application WO 2009/072105 A3.
Search Report of PCT Patent Application WO 2009/072104 A3.
Search Report of PCT Patent Application WO 2009/072103 A3.
Search Report of PCT Patent Application WO 2009/072102 A3.
Search Report of PCT Patent Application WO 2009/072101 A3.
Search Report of PCT Patent Application WO 2009/072100 A3.
Search Report of PCT Patent Application WO 2009/053963 A3.
Search Report of PCT Patent Application WO 2009/053962 A3.
Search Report of PCT Patent Application WO 2009/053961 A3.
Search Report of PCT Patent Application WO 2009/037697 A3.
Yani Chen, Kcshab K. Parhi, "Small Area Parallel Chien Search Architectures for Long BCH Codes", Ieee Transactions on Very Large Scale Integration(VLSI) Systems, vol. 12, No. 5, May 2004.
Yuejian Wu, "Low Power Decoding of BCH Codes", Nortel Networks, Ottawa, Ont., Canada, in Circuits and systems, 2004. ISCAS '04. Proceeding of the 2004 International Symposium on Circuits and Systems, published May 23-26, 2004, vol. 2, pp. II-369-72 vol. 2.
Michael Purser, "Introduction to Error Correcting Codes", Artech House Inc., 1995.
Ron M. Roth, "Introduction to Coding Theory", Cambridge University Press, 2006.
Akash Kumar, Sergei Sawitzki, "High-Throughput and Low Power Architectures for Reed Solomon Decoder", (a.kumar at tue.nl, Eindhoven University of Technology and sergei.sawitzki at philips.com).
Todd K.Moon, "Error Correction Coding Mathematical Methods and Algorithms", A John Wiley & Sons, Inc., 2005.

Richard E. Blahut, "Algebraic Codes for Data Transmission", Cambridge University Press, 2003.
David Esseni, Bruno Ricco, "Trading-Off Programming Speed and Current Absorption in Flash Memories with the Ramped-Gate Programming Technique", Ieee Transactions on Electron Devices, vol. 47, No. 4, Apr. 2000.
Giovanni Campardo, Rino Micheloni, David Novosel, "VLSI-Design of Non-Volatile Memories", Springer Berlin Heidelberg New York, 2005.
John G. Proakis, "Digital Communications", 3rd ed., New York: McGraw-Hill, 1995.
J.M. Portal, H. Aziza, D. Nee, "EEPROM Memory: Threshold Voltage Built in Self Diagnosis", ITC International Test Conference, Paper 2.1.
J.M. Portal, H. Aziza, D. Nee, "EEPROM Diagnosis Based on Threshold Voltage Embedded Measurement", Journal of Electronic Testing: Theory and Applications 21, 33-42, 2005.
G. Tao, A. Scarpa, J. Dijkstra, W. Stidl, F. Kuper, "Data retention prediction for modern floating gate non-volatile memories", Microelectronics Reliability 40 (2000), 1561-1566.
T. Hirncno, N. Matsukawa, H. Hazama, K. Sakui, M. Oshikiri, K. Masuda, K. Kanda, Y. Itoh, J. Miyamoto, "A New Technique for Measuring Threshold Voltage Distribution in Flash EEPROM Devices", Proc. IEEE 1995 Int. Conference on Microelectronics Test Structures, vol. 8, Mar. 1995.
Boaz Eitan, Guy Cohen, Assaf Shappir, Eli Lusky, Amichai Givant, Meir Janai, Ilan Bloom, Yan Polansky, Oleg Dadashev, Avi Lavan, Ran Sahar, Eduardo Maayan, "4-bit per Cell NROM Reliability", Appears on the website of Saifun.com.
Paulo Cappelletti, Clara Golla, Piero Olivo, Enrico Zanoni, "Flash Memories", Kluwer Academic Publishers, 1999.
JEDEC Standard, "Stress-Test-Driven Qualification of Integrated Circuits", JEDEC Solid State Technology Association. JEDEC Standard No. 47F pp. 1-26.
Dempster, et al., "Maximum Likelihood from Incomplete Data via the EM Algorithm", Journal of the Royal Statistical Society. Series B (Methodological), vol. 39, No. 1 (1997), pp. 1-38.
Mielke, et al., "Flash EEPROM Threshold Instabilities due to Charge Trapping During Program/Erase Cycling", IEEE Transactions on Device and Materials Reliability, vol. 4, No. 3, Sep. 2004, pp. 335-344.
Daneshbeh, "Bit Serial Systolic Architectures for Multiplicative Inversion and Division over GF (2)", A thesis presented to the University of Waterloo, Ontario, Canada, 2005, pp. 1-118.
Chen, Formulas for the solutions of Quadratic Equations over GF (2), IEEE Trans. Inform. Theory, vol. IT-28, No. 5, Sep. 1982, pp. 792-794.
Berlekamp et al., "On the Solution of Algebraic Equations over Finite Fields", Inform. Cont. 10, Oct. 1967, pp. 553-564.

* cited by examiner

| original number | 7.1 | 7.5 | 7.7 | -7.1 | -7.5 | -7.7 |
|---|---|---|---|---|---|---|
| floor | 7 | 7 | 7 | -7 | -7 | -7 |
| ceiling | 8 | 8 | 8 | -8 | -8 | -8 |
| rounding away from zero | 7 | 8 | 8 | -7 | -8 | -8 |
| rounding toward zero | 7 | 7 | 8 | -7 | -7 | -8 |

| A | B | C | f |
|---|---|---|---|
| 0 | 0 | ∅ | 0 |
| 0 | 1 | ∅ | 1 |
| 1 | 0 | ∅ | 0 |
| 1 | 1 | 0 | 0 |
| 1 | 1 | 1 | 1 |

710 — Truncate N bits from an original M-bit input number thereby to provide M - N bits.

720 — Determine whether the input number is positive (the MSB bit is '1') and the N truncated bits represent exactly ½ (i.e. '1' followed by N - 1 replicas of '0'). If so, terminate, to keep the rounding operation unbiased.

730 — Otherwise, add the equivalent value of '½' to the M - N bits to implement rounding.

FIG. 7

| A | B | C | f |
|---|---|---|---|
| 0 | 0 | ∅ | 0 |
| 0 | 1 | 0 | 0 |
| 0 | 1 | 1 | 1 |
| 1 | 0 | ∅ | 0 |
| 1 | 1 | ∅ | 1 |

APPARATUS AND METHODS FOR HARDWARE-EFFICIENT UNBIASED ROUNDING

CROSS-REFERENCE TO RELATED APPLICATIONS

This application is a National Phase Application of PCT International Application No. PCT/IL2008/001240, entitled "APPARATUS AND METHODS FOR HARDWARE-EFFICIENT UNBIASED ROUNDING", International Filing Date Sep. 17, 2008, published on Oct. 1, 2009 as International Publication No. WO 2009/118720, which in turn claims priority from US Provisional Application No. 61/064,760, filed Mar. 25, 2008 and entitled "Hardware Efficient Implementation of Rounding in Fixed-Point Arithmetic" and US Provisional Application No. 61/071,404, filed Apr. 28, 2008 and entitled "Apparatus and Methods for Hardware-Efficient Unbiased Rounding", all of which are incorporated herein by reference in their entirety.

Other co-pending applications include: U.S. Provisional Application No. 60/960,207, filed Sep. 20, 2007 and entitled "Systems and Methods for Coupling Detection in Flash Memory", U.S. Provisional Application No. 61/071,467, filed Apr. 30, 2008 and entitled "Improved Systems and Methods for Determining Logical Values of Coupled Flash Memory Cells", U.S. Provisional Application No. 60/960,943, filed Oct. 22, 2007 and entitled "Systems and methods to reduce errors in Solid State Disks and Large Flash Devices" and U.S. Provisional Application No. 61/071,469, filed Apr. 30, 2008 and entitled "Systems and Methods for Averaging Error Rates in Non-Volatile Devices and Storage Systems", U.S. Provisional Application No. 60/996,027, filed Oct. 25, 2007 and entitled "Systems and Methods for Coping with Variable Bit Error Rates in Flash Devices", U.S. Provisional Application No. 61/071,466, filed Apr. 30, 2008 and entitled "Systems and Methods for Multiple Coding Rates in Flash Devices", U.S. Provisional Application No. 61/006,120, filed Dec. 19, 2007 and entitled "Systems and Methods for Coping with Multi Stage Decoding in Flash Devices", U.S. Provisional Application No. 61/071,464, filed Apr. 30, 2008 and entitled "A Decoder Operative to Effect A Plurality of Decoding Stages Upon Flash Memory Data and Methods Useful in Conjunction Therewith", U.S. Provisional Application No. 61/006,385, filed Jan. 10, 2008 and entitled "A System for Error Correction Encoder and Decoder Using the Lee Metric and Adapted to Work on Multi-Level Physical Media", US Provisional Application No. 61/064,995, filed Apr. 8, 2008 and entitled "Systems and Methods for Error Correction and Decoding on Multi-Level Physical Media", U.S. Provisional Application No. 60/996,948, filed Dec. 12, 2007 and entitled "Low Power BCH/RS Decoding: a Low Power Chien-Search Implementation", U.S. Provisional Application No. 61/071,487, filed May 1, 2008 and entitled "Chien-Search System Employing a Clock-Gating Scheme to Save Power for Error Correction Decoder and other Applications", U.S. Provisional Application No. 61/071,468, filed Apr. 30, 2008 and entitled "A Low Power Chien-Search Based BCH/RS Recoding System for Flash Memory, Mobile Communications Devices and Other Applications", U.S. Provisional Application No. 60/996,782, filed Dec. 5, 2007 and entitled "Systems and Methods for Using a Training Sequence in Flash Memory", U.S. Provisional Application No. 61/064,853, filed Mar. 31, 2008 and entitled "Flash Memory Device with Physical Cell Value Deterioration Accommodation and Methods Useful in Conjunction Therewith", U.S. Provisional Application No. 61/129,608, filed Jul. 8, 2008 and entitled "A Method for Acquiring and Tracking Detection Thresholds in Flash Devices", U.S. Provisional Application No. 61/006,806, filed Jan. 31, 2008 and entitled "Systems and Methods for using a Erasure Coding in Flash memory", U.S. Provisional Application No. 61/071,486, filed May 1, 2008 and entitled "Systems and Methods for Handling Immediate Data Errors in Flash Memory", U.S. Provisional Application No. 61/006,078, filed Dec. 18, 2007 and entitled "Systems and Methods for Multi Rate Coding in Multi Level Flash Devices", U.S. Provisional Application No. 61/064,923, filed Apr. 30, 2008 and entitled "Apparatus For Coding At A Plurality Of Rates In Multi-Level Flash Memory Systems, And Methods Useful In Conjunction Therewith", U.S. Provisional Application No. 61/006,805, filed Jan. 31, 2008 and entitled "A Method for Extending the Life of Flash Devices", U.S. Provisional Application No. 61/071,465, filed Apr. 30, 2008 and entitled "Systems and Methods for Temporarily Retiring Memory Portions", U.S. Provisional Application No. 61/136,234, filed Aug. 20, 2008 and entitled "A Method Of Reprogramming A Non-Volatile Memory Device Without Performing An Erase Operation", U.S. Provisional Application No. 61/129,414, filed Jun. 25, 2008 and entitled "Improved Programming Speed in Flash Devices Using Adaptive Programming", and several other co-pending patent applications being filed concurrently (same day).

FIELD OF THE INVENTION

The present invention relates generally to bit reduction and more particularly to rounding.

BACKGROUND OF THE INVENTION

Two's complement arithmetic is known.

Clipping, according to Wikipedia, "is a form of distortion that limits a signal once it exceeds a threshold. Clipping may occur when a signal is recorded by a sensor that has constraints on the range of data it can measure, it can occur when a signal is digitized, or it can occur any other time an analog or digital signal is transformed. Clipping may be described as hard, in cases where the signal is strictly limited at the threshold, producing a flat cutoff; or it may be described as soft, in cases where the clipped signal continues to follow the original at a reduced gain. Hard clipping results in many high frequency harmonics; soft clipping results in fewer higher order harmonics and intermodulation distortion components.

"In digital signal processing, clipping occurs when the signal is restricted by the range of a chosen representation. For example in a system using 16-bit signed integers, 32767 is the largest positive value that can be represented, and if during processing the amplitude of the signal is doubled, sample values of 32000 should become 64000, but instead they are truncated to the maximum, 32767. Clipping is preferable to the alternative in digital systems—wrapping—which occurs if the digital hardware is allowed to "overflow", ignoring the most significant bits of the magnitude, and sometimes even the sign of the sample value, resulting in gross distortion of the signal.

"The incidence of clipping may be greatly reduced by using floating point numbers instead of integers. However, floating point numbers are usually less efficient to use, sometimes result in a loss of precision, and they can still clip if a number is extremely large or small.

"Clipping can be detected by viewing the signal (on an oscilloscope, for example), and observing that the tops and bottoms of waves aren't smooth anymore. When working with images, some tools can highlight all pixels that are pure white, allowing the user to identify larger groups of white pixels and decide if too much clipping has occurred. To avoid clipping, the signal can be dynamically reduced using a limiter. If not done carefully, this can still cause undesirable distortion, but it prevents any data from being completely lost."

Rounding, according to Wikipedia, is "the process of reducing the number of significant digits in a number. The result of rounding is a "shorter" number having fewer non-zero digits yet similar in magnitude. The result is less precise but easier to use. For example: 73 rounded to the nearest ten is 70, because 73 is closer to 70 than to 80. Rounding can be analyzed as a form of quantization. There are many different rules that can be followed when rounding. Some of the more popular are described below.

"Common method: This method is commonly used in mathematical applications, for example in accounting. It is the one generally taught in elementary mathematics classes. This method is also known as Symmetric Arithmetic Rounding or Round-Half-Up (Symmetric Implementation): Decide which is the last digit to keep. Increase it by 1 if the next digit is 5 or more (this is called rounding up). Leave it the same if the next digit is 4 or less (this is called rounding down). Examples: 3.044 rounded to hundredths is 3.04 (because the next digit, 4, is less than 5). 3.045 rounded to hundredths is 3.05 (because the next digit, 5, is 5 or more). 3.0447 rounded to hundredths is 3.04 (because the next digit, 4, is less than 5). For negative numbers the absolute value is rounded. Examples: −2.1349 rounded to hundredths is −2.13. −2.1350 rounded to hundredths is −2.14.

"Round-to-even method: This method is also known as unbiased rounding, convergent rounding, statistician's rounding, Dutch rounding or bankers' rounding. It is identical to the common method of rounding except when the digit(s) following the rounding digit starts with a five and has no non-zero digits after it. The new algorithm is: Decide which is the last digit to keep. Increase it by 1 if the next digit is 6 or more, or a 5 followed by one or more non-zero digits. Leave it the same if the next digit is 4 or less. Otherwise, if all that follows the last digit is a 5 and possibly trailing zeroes; then change the last digit to the nearest even digit. That is, increase the rounded digit if it is currently odd; leave it if it is already even.

"With all rounding schemes there are two possible outcomes: increasing the rounding digit by one or leaving it alone. With traditional rounding, if the number has a value less than the half-way mark between the possible outcomes, it is rounded down; if the number has a value exactly half-way or greater than half-way between the possible outcomes, it is rounded up. The round-to-even method is the same except that numbers exactly half-way between the possible outcomes are sometimes rounded up—sometimes down.

"Although it is customary to round the number 4.5 up to 5, in fact 4.5 is no nearer to 5 than it is to 4 (it is 0.5 away from both). When dealing with large sets of scientific or statistical data, where trends are important, traditional rounding on average biases the data upwards slightly. Over a large set of data, or when many subsequent rounding operations are performed as in digital signal processing, the round-to-even rule tends to reduce the total rounding error, with (on average) an equal portion of numbers rounding up as rounding down. This generally reduces the upwards skewing of the result.

"Round-to-even is used rather than round-to-odd as the latter rule would prevent rounding to a result of zero. Examples: 3.016 rounded to hundredths is 3.02 (because the next digit (6) is 6 or more). 3.013 rounded to hundredths is 3.01 (because the next digit (3) is 4 or less). 3.015 rounded to hundredths is 3.02 (because the next digit is 5, and the hundredths digit (1) is odd). 3.045 rounded to hundredths is 3.04 (because the next digit is 5, and the hundredths digit (4) is even). 3.04501 rounded to hundredths is 3.05 (because the next digit is 5, but it is followed by non-zero digits) . . . .

"Other methods of rounding exist, but use is mostly restricted to computers and calculators, statistics and science. In computers and calculators, these methods are used for one of two reasons: speed of computation or usefulness in certain computer algorithms. In statistics and science, the primary use of alternate rounding schemes is to reduce bias, rounding error and drift—these are similar to round-to-even rounding. They make a statistical or scientific calculation more accurate.

"Other methods of rounding include "round towards zero" (also known as truncation) and "round away from zero". These introduce more round-off error and therefore are rarely used in statistics and science; they are still used in computer algorithms because they are slightly easier and faster to compute. Two specialized methods used in mathematics and computer science are the floor (always round down to the nearest integer) and ceiling (always round up to the nearest integer).

"Stochastic rounding is a method that rounds to the nearest integer, but when the two integers are equidistant (e.g., 3.5), then it is rounded up with probability 0.5 and down with probability 0.5. This reduces any drift, but adds randomness to the process. Thus, if you perform a calculation with stochastic rounding twice, you may not end up with the same answer. The motivation is similar to statistician's rounding . . . .

"The objective of rounding is often to get a number that is easier to use, at the cost of making it less precise. However, for evaluating a function with a discrete domain and range, rounding may be involved in an exact computation, e.g. to find the number of Sundays between two dates, or to compute a Fibonacci number. In such cases the algorithm can typically be set up such that computational rounding errors before the explicit rounding do not affect the outcome of the latter. For example, if an integer divided by 7 is rounded to an integer, a computational rounding error up to 1/14 in the division (which is much more than is possible in typical cases) does not affect the outcome. In the case of rounding down an integer divided by 7 this is not the case, but it applies e.g. if the number to be rounded down is an integer plus ½, divided by 7."

Rounding functions exist in many programming languages and applications such as C, PHP, Python, JavaScript, Visual Basic, Microsoft SQL Server, Microsoft Excel. U.S. Pat. No. 4,589,084 5/1986 describes an example of state of the art rounding apparatus.

Conventional flash memory technology is described in the following publications inter alia:

[1] Paulo Cappelletti, Clara Golla, Piero Olivo, Enrico Zanoni, "Flash Memories", Kluwer Academic Publishers, 1999

[2] G. Campardo, R. Micheloni, D. Novosel, "CLSI-Design of Non-Volatile Memories", Springer Berlin Heidelberg New York, 2005

The disclosures of all publications and patent documents mentioned in the specification, and of the publications and patent documents cited therein directly or indirectly, are hereby incorporated by reference.

SUMMARY OF THE INVENTION

Described herein is an unbiased rounding "away from zero" system comprising apparatus for truncating N bits from an original M bit input number thereby to provide a M−N bit number, and apparatus for adding the equivalent value of '½' to the M−N bit number unless the input number is negative and the N truncated bits represent exactly ½, all constructed and operative in accordance with certain embodiments of the present invention.

Also described herein is an unbiased rounding "toward zero" system comprising apparatus for truncating N bits from an original M bit input number thereby to provide a M−N bit number, and apparatus for adding the equivalent value of '½' to the M−N bit number unless the input number is positive and the N truncated bits represent exactly ½, all constructed and operative in accordance with certain embodiments of the present invention.

Particular advantages of certain embodiments of the present invention include some or all of the following:

a. The gate count of the apparatus which may be employed to implement certain embodiments of the invention is less than the gate count of conventional apparatus described herein for rounding two's complement represented signed numbers toward or away from zero, thereby to provide compact, low power apparatus.

b. The apparatus which may be employed to implement certain embodiments of the invention allows clipping to follow rounding as is demanded in many applications, using any other apparatus.

There is thus provided, in accordance with at least one embodiment of the present invention, a method for rounding two's complement represented signed numbers away from zero, the method comprising providing an M-bit two's complement represented signed number to be rounded to an (M−N) bit two's-complement represented signed number, truncating N bits from the right of the M-bit two's complement represented number, thereby to generate an (M−N) bit truncated number and thereby to define a sequence of N truncated bits; if the M-bit two's complement represented signed number is negative and the sequence of N truncated bits comprises a most significant bit of 1, followed by zeros, outputting the (M−N) bit truncated number; and otherwise, computing and outputting a sum of the most significant of the sequence of truncated bits and the (M−N) bit truncated number.

Also provided, in accordance with at least one embodiment of the present invention, is a method for rounding two's complement represented signed numbers toward zero, the method comprising providing an M-bit two's complement represented signed number to be rounded to an (M−N) bit two's-complement represented signed number, truncating N bits from the right of the M-bit two's complement represented number, thereby to generate an (M−N) bit truncated number and thereby to define a sequence of N truncated bits, if the M-bit two's complement represented signed number is positive and the sequence of N truncated bits comprises a most significant bit of 1, followed by zeros, outputting the (M−N) bit truncated number; and otherwise, computing and outputting a sum of the most significant of the sequence of truncated bits and the (M−N) bit truncated number.

Further in accordance with at least one embodiment of the present invention, the method also comprises providing special treatment for a largest positive number, represented by a '0', followed by M−1 replicas of '1', to prevent the largest positive number from wrapping around zero and rounding to a lowest negative number.

Additionally provided, in accordance with at least one embodiment of the present invention, is a system for rounding two's complement represented signed numbers away from zero, the system comprising a receiver operative to receive an M-bit two's complement represented signed number to be rounded to an (M−N) bit two's-complement represented signed number, a truncator operative to truncate N bits from the right of the M-bit two's complement represented number, thereby to generate an (M−N) bit truncated number and thereby to define a sequence of N truncated bits; and a selector operative, if the M-bit two's complement represented signed number is negative and the sequence of N truncated bits comprises a most significant bit of 1, followed by zeros, to output the (M−N) bit truncated number; and otherwise, to compute and to output a sum of the most significant of the sequence of truncated bits and the (M−N) bit truncated number.

Further provided, in accordance with at least one embodiment of the present invention, is a system for rounding two's complement represented signed numbers toward zero, the system comprising a receiver operative to receive an M-bit two's complement represented signed number to be rounded to an (M−N) bit two's-complement represented signed number; a truncator operative to truncate N bits from the right of the M-bit two's complement represented number, thereby to generate an (M−N) bit truncated number and thereby to define a sequence of N truncated bits; and a selector operative, if the M-bit two's complement represented signed number is positive and the sequence of N truncated bits comprises a most significant bit of 1, followed by zeros, to output the (M−N) bit truncated number; and otherwise, to compute and to output a sum of the most significant of the sequence of truncated bits and the (M−N) bit truncated number.

Still further provided, in accordance with at least one embodiment of the present invention, is a 2's complement arithmetic based hardware device including a system for rounding as described above.

Additionally provided, in accordance with at least one embodiment of the present invention, is a digital signal processing system including a 2's complement arithmetic based hardware device as described above.

Further in accordance with at least one embodiment of the present invention, the system also comprises a clipper providing special treatment for a largest positive number, represented by a '0', followed by M−1 replicas of '1', to prevent the largest positive number from wrapping around zero and rounding toward a lowest negative number.

Any suitable processor, display and input means may be used to process, display, store and accept information, including computer programs, in accordance with some or all of the teachings of the present invention, such as but not limited to a conventional personal computer processor, workstation or other programmable device or computer or electronic computing device, either general-purpose or specifically constructed, for processing; a display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention.

A description of embodiments referred to above, and other embodiments, will follow.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices.

BRIEF DESCRIPTION OF THE DRAWINGS

Certain embodiments of the present invention are illustrated in the following drawings.

DETAILED DESCRIPTION OF CERTAIN EMBODIMENTS

Figure 1:
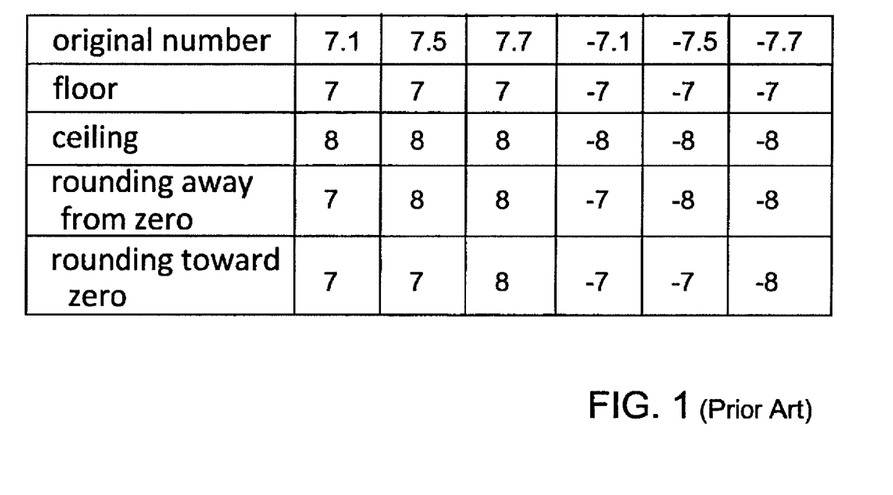
FIG. 1 is a table showing several numerical examples of inputs to and outputs from conventional bit reduction methods.

In fixed-point arithmetic it is often desired to reduce the number of bits which represent a number. In order to prevent bias and minimize rounding error, caused by the bits' number reduction, a rounding operation may be performed. Other common bit reduction methods are floor, ceiling and fix (rounding towards zero). The table of FIG. 1 presents some numerical examples of rounding away from and toward zero as opposed to floor and ceiling operations.

Figure 2:
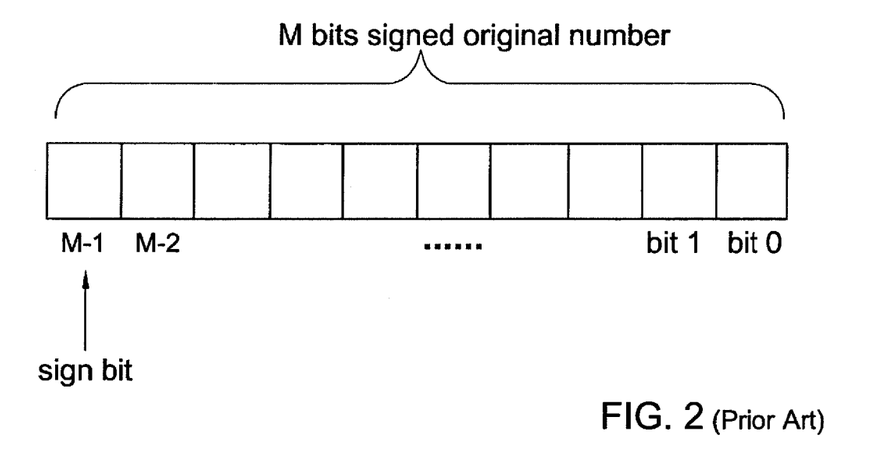
FIG. 2 is a prior art diagram of an M-bit signed original number.

Representation of quantities as signed numbers in 2's complement representation, as illustrated in FIG. 2, is known. The smallest number that can be represented by M bits is $-2^{M-1}$ and the largest number is $2^{M-1}-1$.

The rounding operation is defined as setting to the nearest integer. When the input lies exactly in the middle between two integers, the rounding is away from zero, for both positive and negative numbers.

In hardware, conventionally, rounding of N bits off an M bit positive number is performed by adding the equivalent value of '½' and then truncating N bits from the results. For truncation of N bits, the equivalent value of '½' is '1' followed by N-1 zeroes. Rounding N bits off an M bit negative number is performed by computing the absolute value, rounding it, and then computing back the negative number from the rounding result.

These conventional rounding operations require the following hardware: An M bit adder for the addition of the equivalent value of '½'; M inverters, M 2→1 multiplexers, an M bit adder and a 1 bit comparator for the absolute value computation of the input; and M–N inverters, M–N 2→1 multiplexers, and an M–N bit adder for deriving the output with correct sign.

Figure 3:
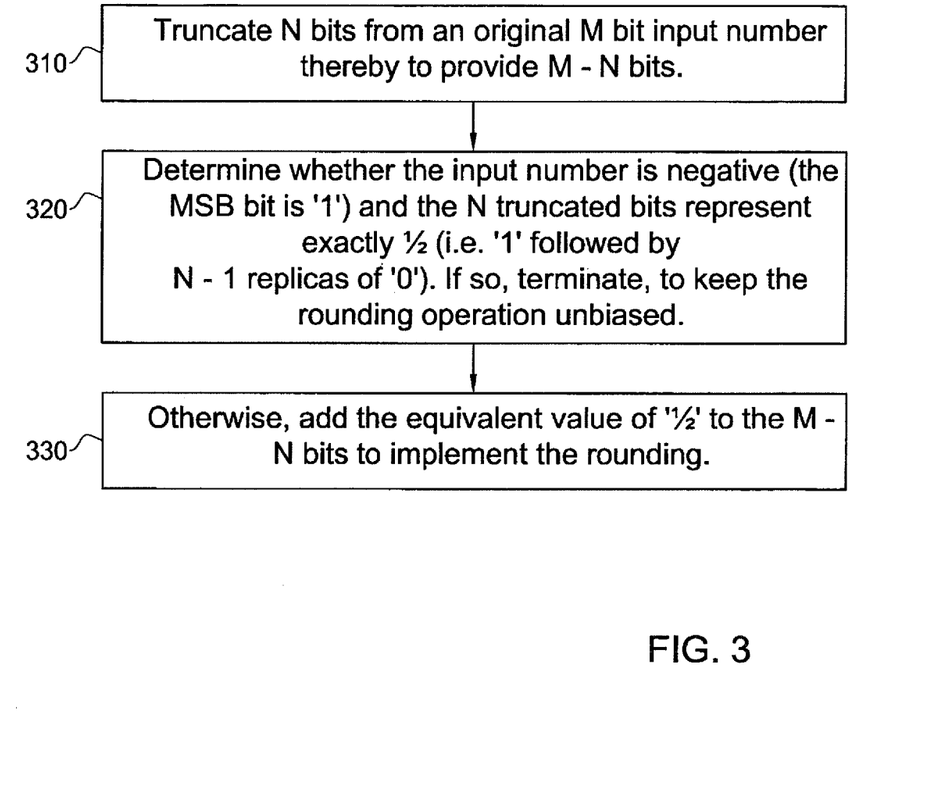
FIG. 3 is a simplified flowchart illustration of a method for rounding away from zero, constructed and operative in accordance with certain embodiments of the present invention.

According to certain embodiments of the present invention, rounding away from zero operations may be performed more efficiently, e.g. as shown in FIG. 3. Efficient methods for effecting rounding toward zero are also described, with reference to FIG. 7, inter alia. The "rounding away from zero" method of FIG. 3 comprises some or all of the following steps, suitably ordered e.g. as shown:

Step 310: Truncate N bits from an original M bit input number thereby to provide M–N bits.

Step 320: Determine whether the input number is negative (the MSB bit is '1') and the N truncated bits represent exactly ½ (i.e. '1' followed by N–1 replicas of '0'). If so, terminate, to keep the rounding operation unbiased.

Step 330: Otherwise, add the equivalent value of '½' to the M–N bits to implement the rounding.

Figure 4:
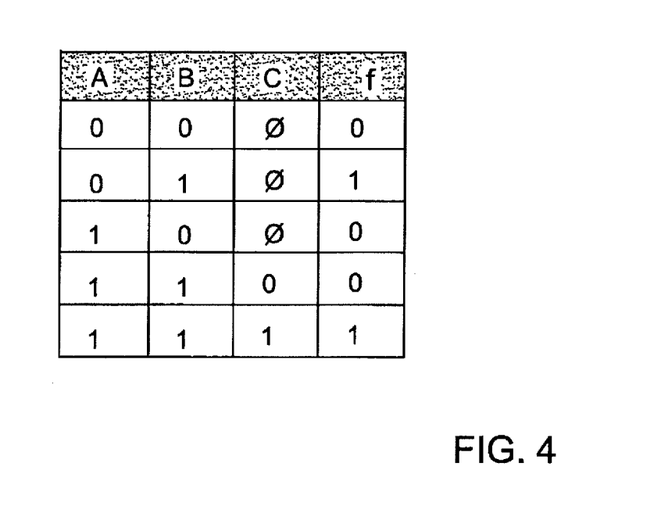
FIG. 4 is a table presenting a decision as to whether or not to add the equivalent value of ½ which is useful in implementing the method of FIG. 3.

The decision as to whether or not to add the equivalent value of ½ is summarized in the table of FIG. 4. The notation for an M bits' signed input W, based on FIG. 2, is:

$A \equiv W^{M-1}(MSB)$ $B \equiv W^{N-1}$ $C \equiv W^{N-2}$ or $W^{N-3}$ or ... or $W^1$ or $W^0$ f=result (e.g. input bit to adder)

Figure 5:
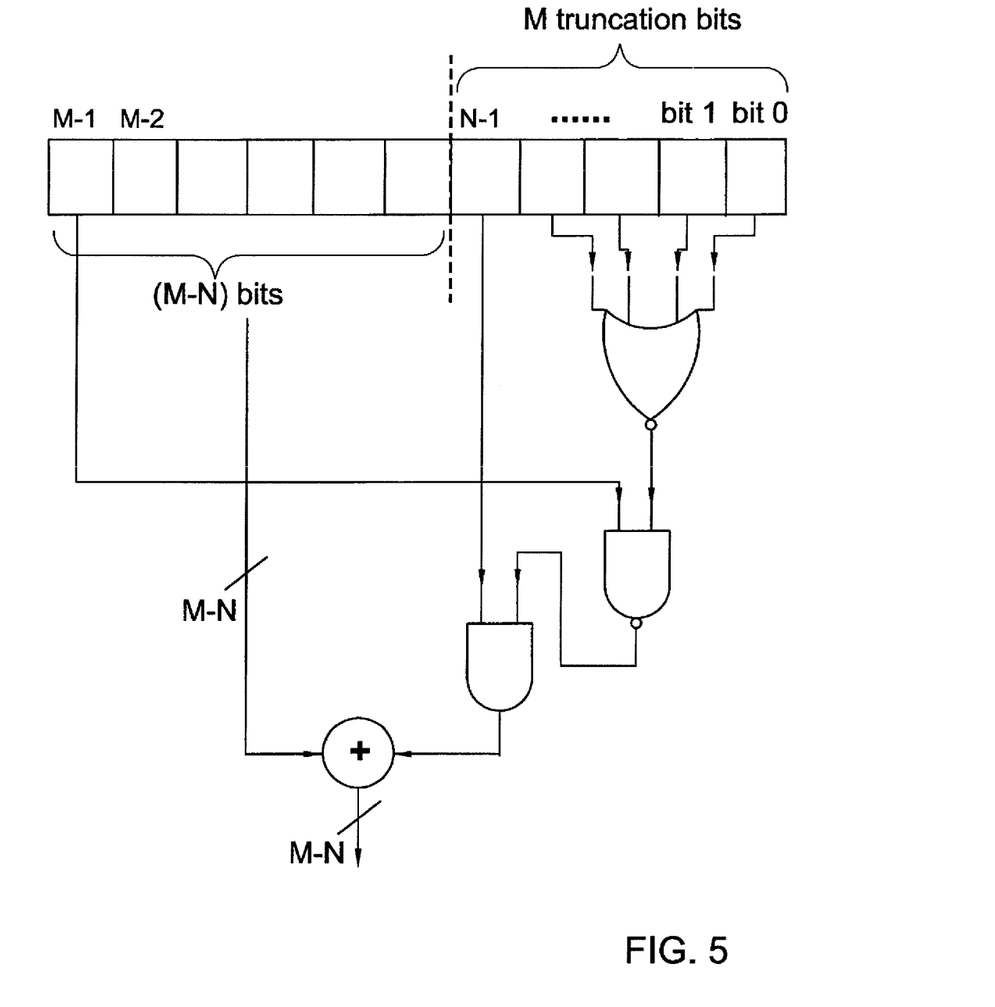
FIG. 5 is a logical diagram of circuitry for rounding away from zero, constructed and operative in accordance with certain embodiments of the present invention and providing efficient unbiased signed rounding with wrap around.

An example hardware implementation of the method of FIG. 3 is shown in FIG. 5. It is appreciated that the table of FIG. 4 is a Truth table for the input to the adder in FIG. 5. The hardware included in the apparatus of FIG. 5 includes an (N−1)-input NOR gate, a 2-input NAND gate, a 2-input AND gate, and an (M−N) bit adder.

Figure 6:
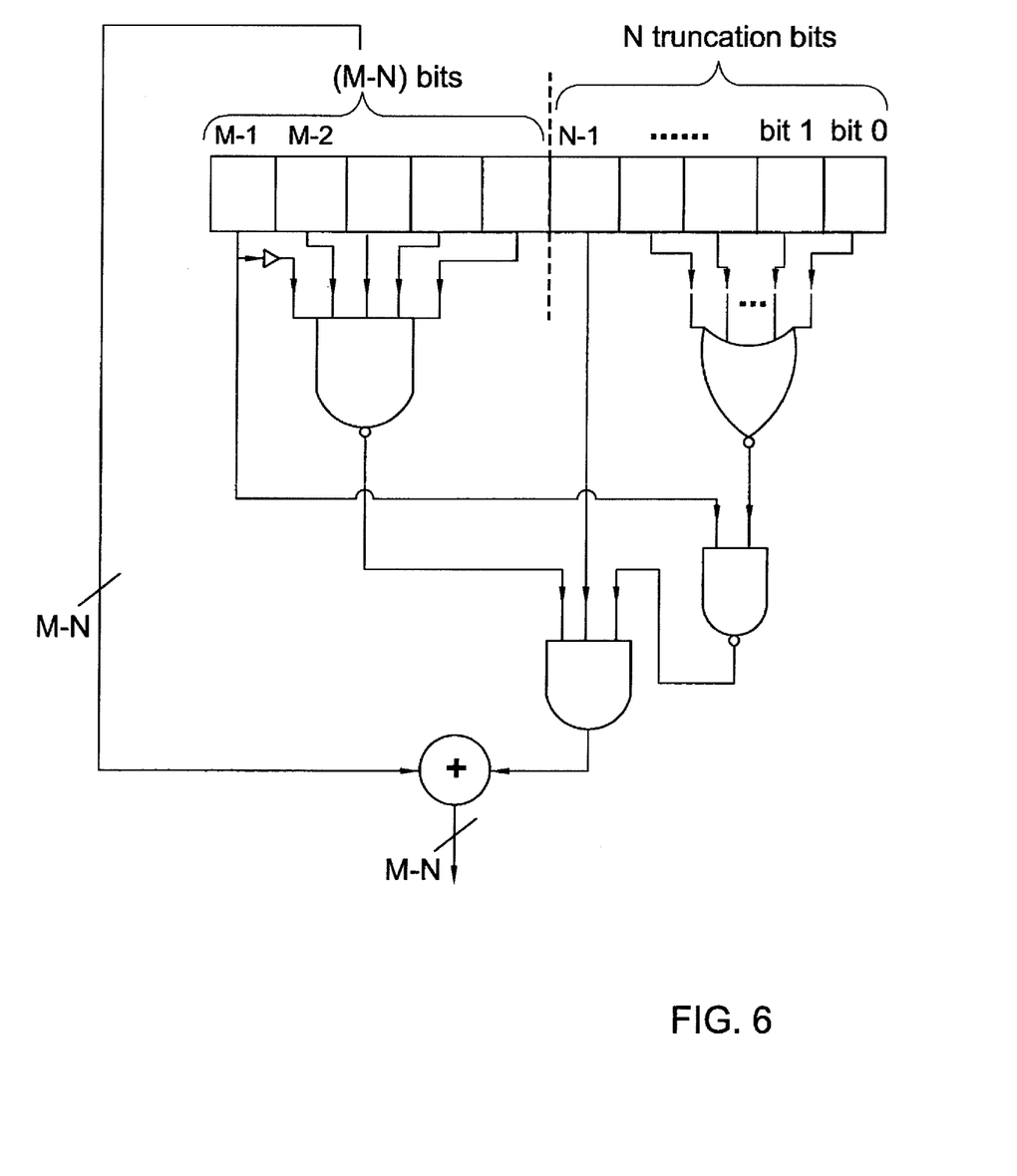
FIG. 6 is a logical diagram of circuitry for rounding away from zero, constructed and operative in accordance with certain embodiments of the present invention, which is a modification of the circuitry of FIG. 5 in that it includes clipping apparatus and provides efficient unbiased signed rounding without wrap around.

Both in conventional rounding and in the rounding apparatus of FIG. 5, the largest positive number, represented by a '0', followed by M−1 replicas of '1' may be regarded as an exception. For this number, rounding of N bits results with '1', followed by M−N−1 replicas of '0'. However, this number is the lowest negative number. Thus, absent special treatment, rounding the highest positive number may result in the lowest negative number due to a process of wrapping around the zero. This exception may be identified and handled e.g. as shown in FIG. 6. The apparatus of FIG. 6 is similar to the apparatus of FIG. 5, however, clipping apparatus, which may be conventional, is added.

A method for rounding "toward zero", provided according to certain embodiments of the present invention, is now described with reference to FIG. 7. Rounding "toward zero" is typically defined as setting to the nearest integer, and when the input lies exactly in the middle between two integers, the rounding is toward zero, for both positive and negative numbers.

The method shown and described herein facilitates a more efficient hardware implementation, compared to conventional apparatus for rounding toward zero. FIG. 7 typically comprises some or all of the following steps, suitably ordered e.g. as shown:

Step 710: Truncate N bits from an original M-bit input number thereby to provide M−N bits.

Step 720: Determine whether the input number is positive (the MSB bit is '1') and the N truncated bits represent exactly ½ (i.e. '1' followed by N−1 replicas of '0'). If so, terminate, to keep the rounding operation unbiased.

Step 730: Otherwise, add the equivalent value of ½ to the M−N bits to implement the rounding.

Figure 8:
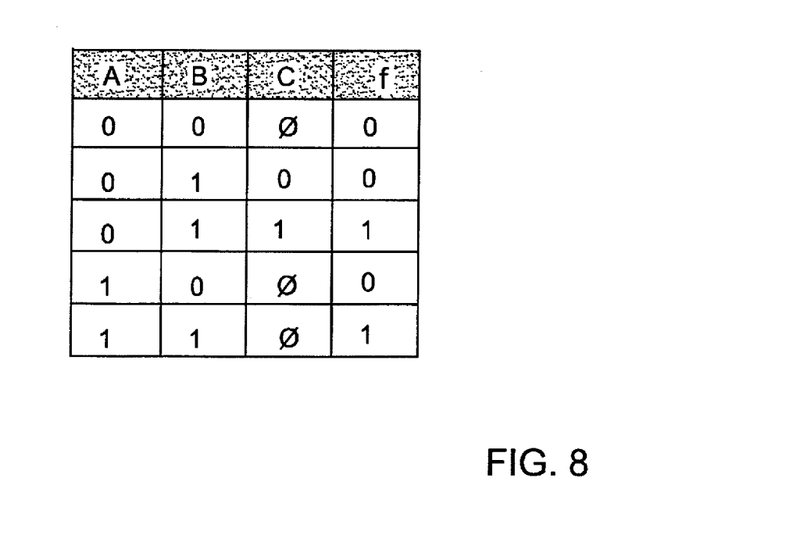
FIG. 8 is a table presenting a decision as to whether or not to add the equivalent value of ½ which is useful in implementing the method of FIG. 7.

The decision when to add the equivalent value of ½ is summarized in the table of FIG. 8.

The notation of FIG. 8 is based on FIG. 2, for an M bit signed input W, and is as follows:

$$A \equiv W^{M-1}(MSB)$$

$$B \equiv W^{N-1}$$

$$C \equiv W^{N-2} \text{ or } W^{N-3} \text{ or } \ldots \text{ or } W^1 \text{ or } W^0$$

f=result (input bit to the adder)

Figure 7:
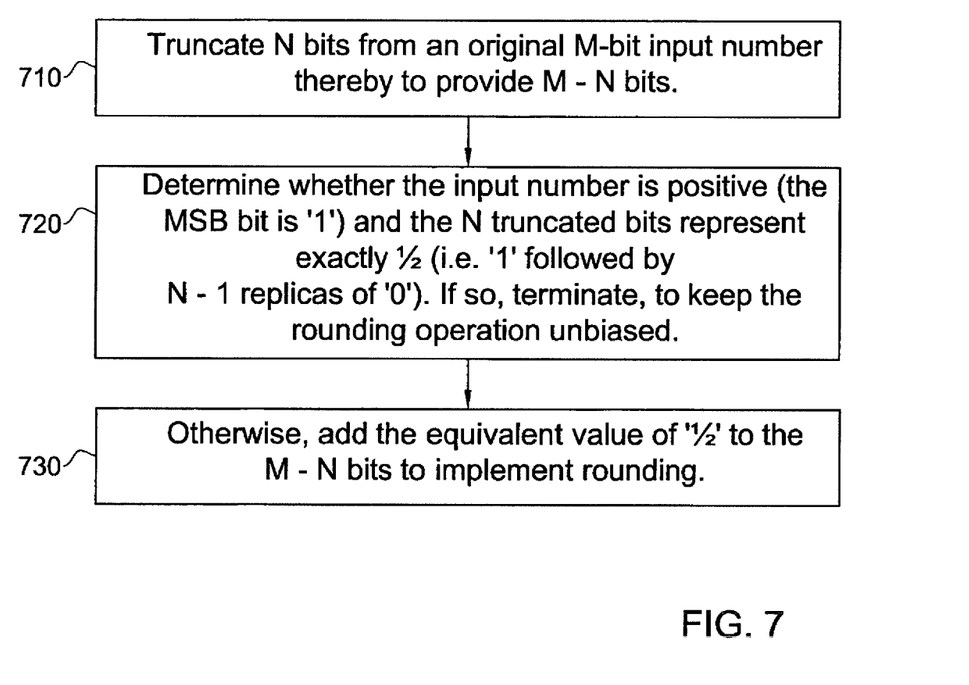
FIG. 7 is a simplified flowchart illustration of a method for rounding toward zero, constructed and operative in accordance with certain embodiments of the present invention.
Figure 9:
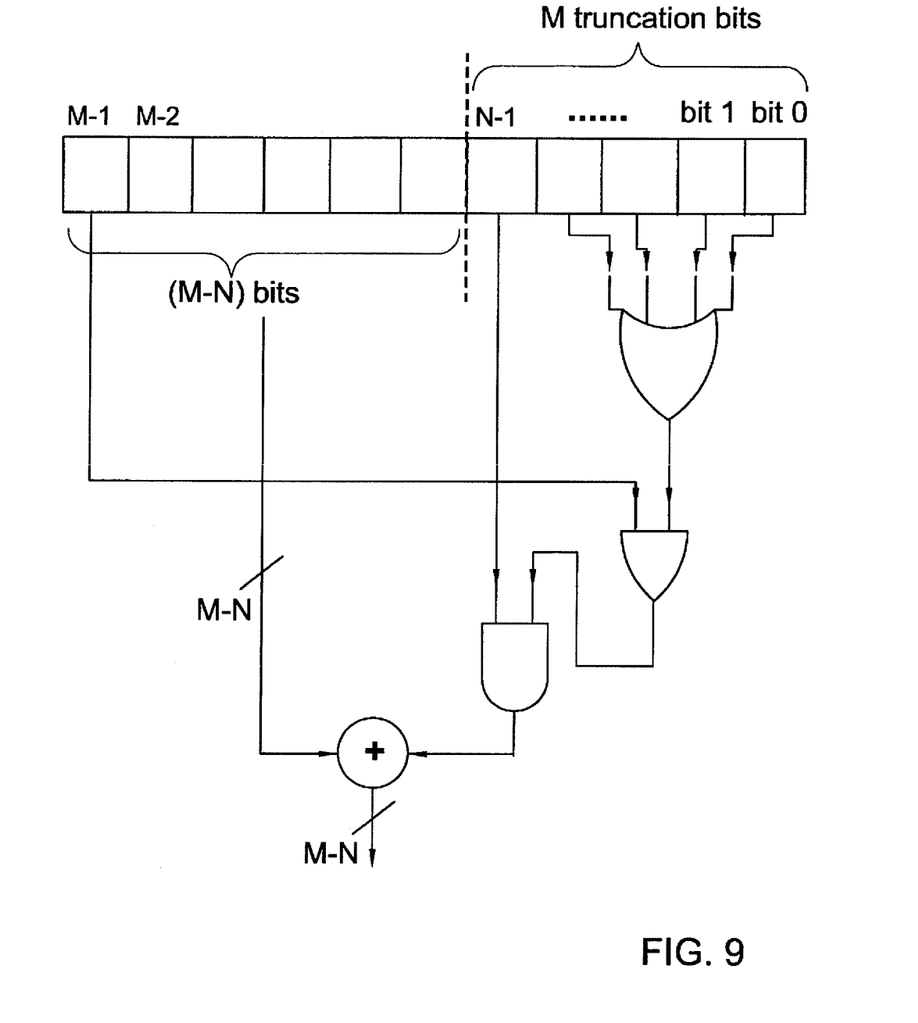
FIG. 9 is a logical diagram of circuitry for rounding toward zero, constructed and operative in accordance with certain embodiments of the present invention and providing efficient unbiased signed rounding with wrap around.

An example hardware implementation of the method of FIG. 7 is shown in FIG. 9. It is appreciated that the table of FIG. 8 is a Truth table for the input to the adder in FIG. 9. The hardware included in the apparatus of FIG. 9 includes an (N−1) input NOR gate, a 2 input NAND gate, a 2-input AND gate, and an (M−N) bit adder.

Both in conventional rounding and in the rounding toward apparatus of FIG. 9, the largest positive number, represented by a '0', followed by M−1 replicas of '1' may be regarded as an exception. For this number, rounding of N bits results with '1', followed by M−N−1 replicas of '0'. However, this number is the lowest negative number. Thus, absent special treatment, rounding the highest positive number may result in the lowest negative number due to a process of wrapping around the zero. This exception, for rounding toward, may be identified and handled by adding conventional clipping apparatus, analogously to the apparatus described above with reference to FIG. 6, for rounding away.

Comparing the rounding away and rounding toward embodiments described herein, it is typically the case that when it is desired to round a signed number "away from" zero, the 'N−1'th bit is added, except if the number is negative (MSB=1) and the [N−1:0] bits are "100 . . . 000" (equivalent ½). In contrast, when it is desired to round a signed number "toward" zero, the 'N−1'th bit is added except if the number is positive (MSB=0) and the [N−1:0] bits are "100 . . . 000" (equivalent ½). There are many applications of the techniques and apparatus shown and described herein in a wide variety of hardware devices that perform computations in 2's complement representation and have occasion to perform rounding, such as but not limited to DSP (Digital Signal Processing) applications e.g. in communication devices (both wired and wireless communication devices), networking, coding, processors, storage devices, or digital TV set—top boxes. It is appreciated that typically, the lower the gate count for implementing rounding operations, the higher the resulting efficiency of the apparatus.

It is appreciated that the particular hardware implementations shown and described herein are not intended to be limiting and any De-Morgan or other logical equivalent of the apparatus specifically shown and described herein is also within the scope of the present invention.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client's for using such; and hardware which performs any or all of the steps of any of the methods shown and described herein, in any suitable order, either alone or in conjunction with software.

Certain operations are described herein as occurring in the microcontroller internal to a flash memory device. Such description is intended to include operations which may be performed by hardware which may be associated with the microcontroller such as peripheral hardware on a chip on which the microcontroller may reside. It is also appreciated that some or all of these operations, in any embodiment, may alternatively be performed by the external, host-flash memory device interface controller including operations which may be performed by hardware which may be associated with the interface controller such as peripheral hardware on a chip on which the interface controller may reside. Finally it is appreciated that the internal and external controllers may each physically reside on a single hardware device, or alternatively on several operatively associated hardware devices.

Any data described as being stored at a specific location in memory may alternatively be stored elsewhere, in conjunction with an indication of the location in memory with which the data is associated. For example, instead of storing page- or erase-sector-specific information within a specific page or erase sector, the same may be stored within the flash memory device's internal microcontroller or within a microcontroller interfacing between the flash memory device and the host, and an indication may be stored of the specific page or erase sector associated with the cells.

It is appreciated that the teachings of the present invention can, for example, be implemented by suitably modifying, or interfacing externally with, flash controlling apparatus. The flash controlling apparatus controls a flash memory array and may comprise either a controller external to the flash array or a microcontroller on-board the flash array or otherwise incorporated therewithin. Examples of flash memory arrays include Samsung's K9XXG08UXM series, Hynix's HY27UK08BGFM Series, Micron's MT29F64G08TAAWP or other arrays such as but not limited to NOR or phase change memory. Examples of controllers which are external to the flash array they control include STMicroelectrocincs's ST7265× microcontroller family, STMicroelectrocincs's ST72681 microcontroller, and SMSC's USB97C242, Traspan Technologies' TS-4811, Chipsbank CBM2090/CBM1190. Example of commercial IP software for Flash file systems are: Denali's Spectra™ NAND Flash File System, Aarsan's NAND Flash Controller IP Core and Arasan's NAND Flash File System. It is appreciated that the flash controller apparatus need not be NAND-type and can alternatively, for example, be NOR-type or phase change memory-type.

Flash controlling apparatus, whether external or internal to the controlled flash array, typically includes the following components: a Memory Management/File system, a NAND interface (or other flash memory array interface), a Host Interface (USB, SD or other), error correction circuitry (ECC) typically comprising an Encoder and matching decoder, and a control system managing all of the above.

The present invention may for example interface with or modify, as per any of the embodiments described herein, one, some or all of the above components and particularly with the ECC component.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting.

What is claimed is:

1. A method for rounding two's complement represented signed numbers away from zero, the method comprising: providing an M-bit two's complement represented signed number to be rounded to an (M−N) bit two's-complement represented signed number; truncating N bits from the right of the M-bit two's complement represented number, thereby to generate an (M−N) bit truncated number and thereby to define a sequence of N truncated bits; if the M-bit two's complement represented signed number is negative and the sequence of N truncated bits comprises a most significant bit of 1, followed by zeros, outputting the (M−N) bit truncated number; and otherwise, computing and outputting a sum of (a) a number that has an equivalent value of one followed by (N−1) replicas of zero, the one provided by applying a logical operation on the most significant bit of the sequence of truncated bits and (b) the (M−N) bit truncated number; rounding two's complement represented signed numbers away from zero by a circuit that essentially consists of a (N−1) input NOR gate, a first NAND gate, a first AND gate, an adder, a (M−N) input NAND gate, an inverter; wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate; wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

2. The method according to claim 1 and also comprising providing special treatment for a largest positive number, represented by a '0', followed by M−1 replicas of '1', to prevent said largest positive number from wrapping around zero and rounding toward a lowest negative number.

3. The method according to claim 2 comprising checking if the M-bit two's compliment represented signed number is the largest positive number by the (M−N) input NAND gate.

4. A method for rounding two's complement represented signed numbers toward zero, the method comprising: providing an M-bit two's complement represented signed number to be rounded to an (M−N) bit two's-complement represented signed number; truncating N bits from the right of the M-bit two's complement represented number, thereby to generate an (M−N) bit truncated number and thereby to define a sequence of N truncated bits; if the M-bit two's complement represented signed number is positive and the sequence of N truncated bits comprises a most significant bit of 1, followed by zeros, outputting the (M−N) bit truncated number; and otherwise, computing and outputting a sum of (a) a number that has an equivalent value of one followed by (N−1) replicas of zero, the one provided by applying a logical function on the most significant bit of said sequence of truncated bits and (b) the (M−N) bit truncated number; rounding two's complement represented signed numbers towards zero by a circuit that essentially consists of a (N−1) input NOR gate, a first NAND gate, a first AND gate, an adder, a (M−N) input NAND gate, an inverter; wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate; wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

5. A method according to claim 4 and also comprising providing special treatment for a largest positive number, represented by a '0', followed by M−1 replicas of '1', to prevent said largest positive number from wrapping around zero and rounding toward a lowest negative number.

6. A system for rounding two's complement represented signed numbers away from zero, the system comprising: a receiver operative to receive an M-bit two's complement represented signed number to be rounded to an (M−N) bit two's-complement represented signed number; a truncator operative to truncate N bits from the right of the M-bit two's complement represented number, thereby to generate an (M−N) bit truncated number and thereby to define a sequence of N truncated bits; a clipped and a selector operative, if the M-bit two's complement represented signed number is negative and the sequence of N truncated bits comprises a most significant bit of 1, followed by zeros, to output said (M−N) bit truncated number; and otherwise, to compute and to output a sum of (a) a number that has an equivalent value of one followed by (N−1) replicas of zero, the one provided by applying a logical function on the most significant bit of said sequence of truncated bits and (b) the (M−N) bit truncated number; wherein the clipper and the selector essentially consist of a (N−1) input NOR gate, a first NAND gate, a first AND gate, an adder, a (M−N) input NAND gate, an inverter; wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate; wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

7. The system according to claim 6 wherein selector is arranged to check if the M-bit two's compliment represented signed number is a largest positive number by a (M−N) input NAND gate arranged to receive an inverted most significant bit of the M-bit two's compliment represented signed number and to receive non-inverted second till (M−N−1)'th significant bits of the M-bit two's compliment represented signed number.

8. A system according to claim 6 wherein the clipper is arranged to providing special treatment for a largest positive number, represented by a '0', followed by M−1 replicas of '1', to prevent said largest positive number from wrapping around zero and rounding toward a lowest negative number.

9. A system for rounding two's complement represented signed numbers toward zero, the system comprising: a receiver operative to receive an M-bit two's complement represented signed number to be rounded to an (M−N) bit two's-complement represented signed number; a truncator operative to truncate N bits from the right of the M-bit two's complement represented number, thereby to generate an (M−N) bit truncated number and thereby to define a sequence of N truncated bits; a clipper and a selector operative, if the M-bit two's complement represented signed number is positive and the sequence of N truncated bits comprises a most significant bit of 1, followed by zeros, to output said (M−N) bit truncated number; and otherwise, to compute and to output a (a) a number that has an equivalent value of one followed by (N−1) replicas of zero, the one provided by applying a logical function on the most significant bit of said sequence of truncated bits and (b) the (M−N) bit truncated number; wherein the clipper and the selector essentially consist of a (N−1) input NOR gate, a first NAND gate, a first AND gate, an adder, a (M−N) input NAND gate an inverter wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate; wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

10. A system according to claim 9 wherein the clipper provides special treatment for a largest positive number, represented by a '0', followed by M−1 replicas of '1', to prevent said largest positive number from wrapping around zero and rounding toward a lowest negative number.

11. A 2's complement arithmetic based hardware device including a system for rounding, wherein the system for rounding comprises a receiver operative to receive an M-bit two's complement represented signed number to be rounded to an (M−N) bit two's-complement represented signed number; a truncator operative to truncate N bits from the right of the M-bit two's complement represented number, thereby to generate an (M−N) bit truncated number and thereby to define a sequence of N truncated bits; a clipped and a selector operative, if the M-bit two's complement represented signed number is negative and the sequence of N truncated bits comprises a most significant bit of 1 followed by zeros, to output said (M−N) bit truncated number; and otherwise, to compute and to output a sum of (a) a number that has an equivalent value of one followed by (N−1) replicas of zero, the one provided by applying a logical function on the most significant bit of said sequence of truncated bits and (b) the (M−N) bit truncated number; wherein the clipper and the selector essentially consist of a (N−1) input NOR gate, a first NAND gate, a first AND gate, an adder, a (M−N) input NAND gate, an inverter; wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

12. A 2's complement arithmetic based hardware device including a system for rounding that comprises a receiver operative to receive an M-bit two's complement represented signed number to be rounded to an (M−N) bit two's-complement represented signed number; a truncator operative to truncate N bits from the right of the M-bit two's complement represented number, thereby to generate an (M−N) bit truncated number and thereby to define a sequence of N truncated bits; a clipper and a selector operative, if the M-bit two's complement represented signed number is positive and the sequence of N truncated bits comprises a most significant bit of 1, followed by zeros, to output said (M−N) bit truncated number; and otherwise, to compute and to output a (a) a number that has an equivalent value of one followed by (N−1) replicas of zero, the one provided by applying a logical function on the most significant bit of said sequence of truncated bits and (b) the (M−N) bit truncated number; wherein the clipper and the selector essentially consist of a (N−1) input NOR gate, a first NAND gate, a first AND gate, an adder, a (M−N) input NAND gate, an inverter; wherein the inverter is arranged to receive the most significant bit of the M-bit two's complement represented signed number and to invert it to provide an inverted signal; wherein the a (M−N) input NAND gate is arranged to receive the inverted signal and the second till (M−N−1)'th most significant bits of the M-bit two's complement represented signed number; wherein the (N−1) input NOR gate is arranged to receive (N−2) least significant bits of the M-bit two's complement represented signed number and having an output that is coupled to a first input of a first NAND gate: wherein the first NAND gate has a second input of the first NAND gate arranged to receive the most significant bit of the M-bit two's complement represented signed number; wherein the first AND gate is arranged to receive an output signal of the first NOR gate, a most significant bit of the sequence of truncated bits and an output signal of the (M−N) input NAND gate; wherein the adder is arranged to add an output signal of the first OR gate to the (M−N) bit truncated number.

13. A digital signal processing system including a 2's complement arithmetic based hardware device according to claim 11.

14. A digital signal processing system including a 2's complement arithmetic based hardware device according to claim 12.

* * * * *